United States Patent
Celik et al.

(10) Patent No.: US 6,379,419 B1
(45) Date of Patent: *Apr. 30, 2002

(54) METHOD AND TRANSFERRED ARC PLASMA SYSTEM FOR PRODUCTION OF FINE AND ULTRAFINE POWDERS

(75) Inventors: Cesur Celik, Pointe Claire; Tony Addona, St. Léonard; Maher I. Boulos, Sherbrooke; Gangqiang Chen, St-Laurent; H. John Davis, Beaconsfield, all of (CA)

(73) Assignee: Noranda Inc., Toronto (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/136,043

(22) Filed: Aug. 18, 1998

(51) Int. Cl.⁷ .................................................. B22F 9/00
(52) U.S. Cl. ........................................ 75/346; 75/10.19
(58) Field of Search ................................ 75/10.19, 346; 264/43

(56) References Cited

U.S. PATENT DOCUMENTS

| | | | | |
|---|---|---|---|---|
| 4,076,640 A | * | 2/1978 | Forgensi et al. | 252/62.1 |
| 4,376,470 A | | 3/1983 | Uda et al. | 264/10 |
| 4,376,740 A | | 3/1983 | Uda et al. | 264/10 |
| 4,990,179 A | * | 2/1991 | Munday et al. | 75/10.19 |
| 5,147,448 A | * | 9/1992 | Roberts et al. | 75/331 |
| 5,460,701 A | * | 10/1995 | Parker et al. | 204/164 |
| 5,514,350 A | | 5/1996 | Kear et al. | 422/198 |
| 5,855,642 A | * | 1/1999 | Miller et al. | 75/338 |

FOREIGN PATENT DOCUMENTS

DE          269157 A      6/1989    ........... C10G/15/12

OTHER PUBLICATIONS

"Direct current arc–plasma sythesis of tungsten carbides", Journal Of Materials Science, Oct. 1981, UK, vol. 16, No. 10, pp. 2665–2674, XP002123725 ISSN: 0022-2461.

"Generation and behaviour of fine articles particles in thermal plasmas–a review", Plasma Chemistry And Plasma Processing, Mar. 1985, USA, vol. 5, No. 1, pp. 1–37, XP002123724 ISSN: 0272-4324.

Munz et al, "Application of transferred arcs to the production of nanoparticles", Pure Appl. Chem., vol. 71. No. 10, pp 1889–1897, 1999.*

"A New Process for Preparation of Ultrafine Metal Particles", M. Uda, Transactions Of National Research Institute For Metals, vol. 24, No. 4 (1982).

"Modelling Particle Formation and Growth in a Plasma Synthesis Reactor", S.L. Girshick, et al., Plasma Chemistry and Plasma Processing, vol. 8, No. 2 (1988).

(List continued on next page.)

*Primary Examiner*—George Wyszomierski
*Assistant Examiner*—Janelle Combs-Morillo
(74) *Attorney, Agent, or Firm*—Katten Muchin Zavis

(57) ABSTRACT

The present invention is concerned with a method for the production of fine and ultrafine powders of various materials such as metals, alloys, ceramics, composites etc., through a transferred arc plasma system. The method comprises vaporizing or decomposing the material in the plasma reactor, condensing the vapor in a quench tube comprising two sections, the first one for indirectly cooling or heating the vapor, and the second one for directly cooling the vapor. The powder is recovered in a conventional collection unit. The two step condensation in the quench tube allows a substantial control of powder properties like crystallinity, size distribution and mean particle size.

30 Claims, 8 Drawing Sheets

OTHER PUBLICATIONS

"Effect of Quenching Conditions on Particle Formation and Growth in Thermal Plasma Synthesis of Fine Powders", S.V. Joshi, et al., Plasma Chemistry and Plasma Processing, vol. 10, No. 2 (1990).

"Synthesis of Nanometer Size Ceramic Powders in A.D.C. Transfered Arc Plasma Furnace", K. Chang, et al., Third Euro–Ceramics, vol. 1, pp. 15–20.

"Growth of Aluminum Nitride Crystal Under A Nitrogen Transferred Arc Plasma", H. Ageorges, et al., Journal of European Ceramic Society, 8, 1991 pp. 243–250.

"Vapor–Phase Synthesis of Nanosize Aluminum Nitride Particles Using a Two–Stage Transferred Arc Reactor", F.J. Moura, et al., Comm. Of the American Ceramic Society, vol. 80 [9], 1997 pp. 2424–2428.

"Thermal Plasma Production of Fumed Silica:The Effect of Quench Conditions on Thickening and Thixotropic Ability", T. Addona, et al., The Canadian Journal of Chemical Engineering, vol. 72, Jun. 1994, pp. 476–483.

"Evaporation Of Aluminum In A Transferred Arc", F.J. Moura, et al., Symposium on Plasma Chemistry, Aug., 22–27, 1993, Loughborough, England.

"Vapor Phase Synthesis of Fine Particles", A.C. da Cruz, et al., IEEE Transactions On Plasma Science, vol. 25, No. 5, Oct. 1997, pp. 1008–1016.

"The densification and microstructure development of sintered aluminum nitride ultrafine power produced in a two–stage transferred–arc plasma reactor", A.C. de Cruz, et al., Journal of Materials Science Letters, 17 (1998) 1255–1261.

"Silica Decomposition Using a Transferred Arc Process", T. Addona, et al., Industrial & Engineering Chemistry Research, vol. 38, No. 6, 1999, pp. 2299–2303.

* cited by examiner

FIG. I

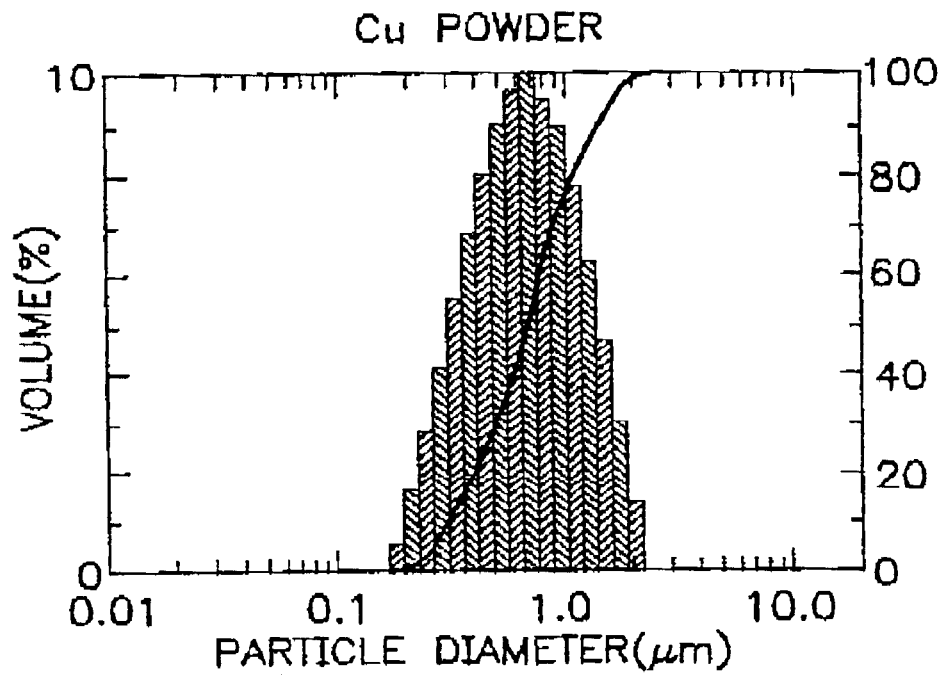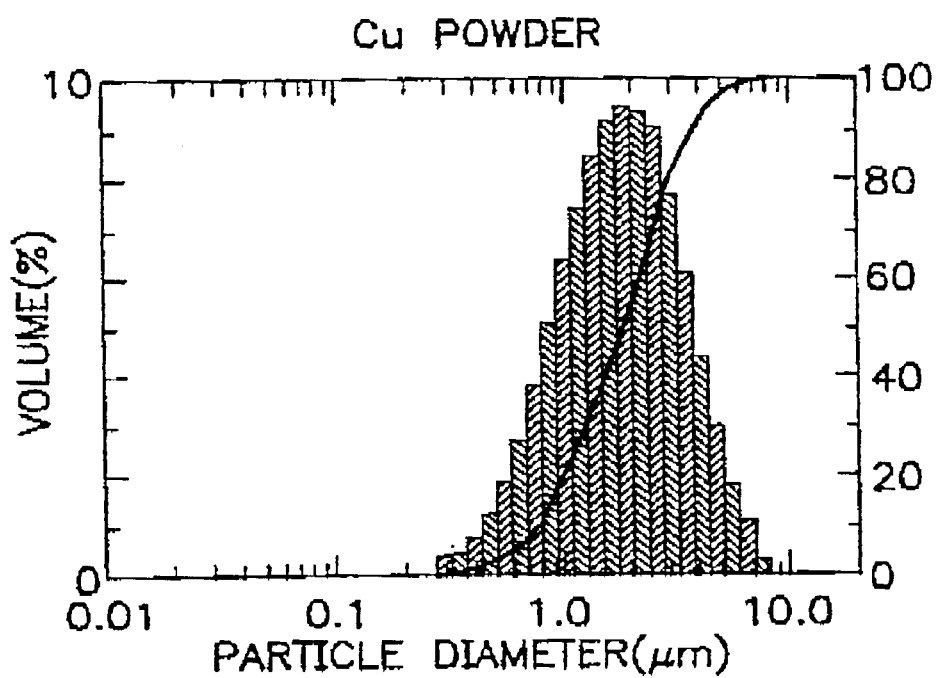
FIG. 6

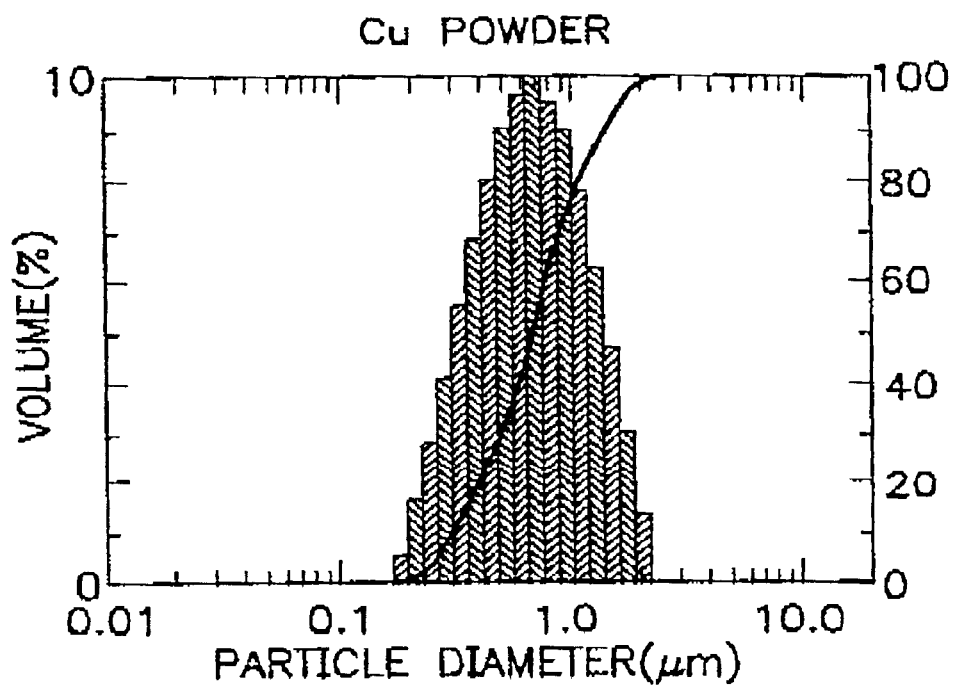
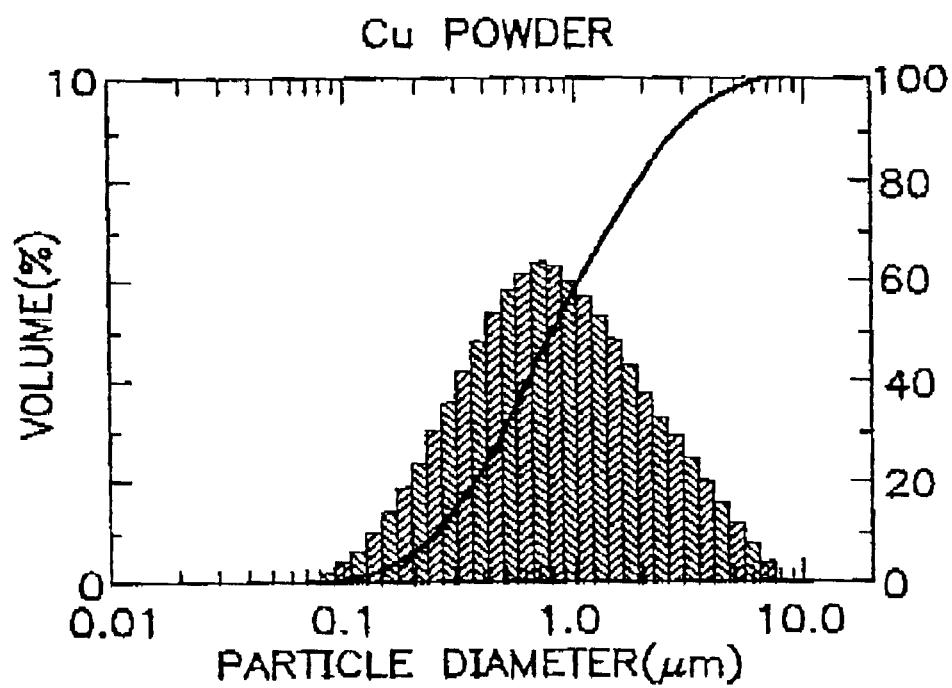
FIG. 7

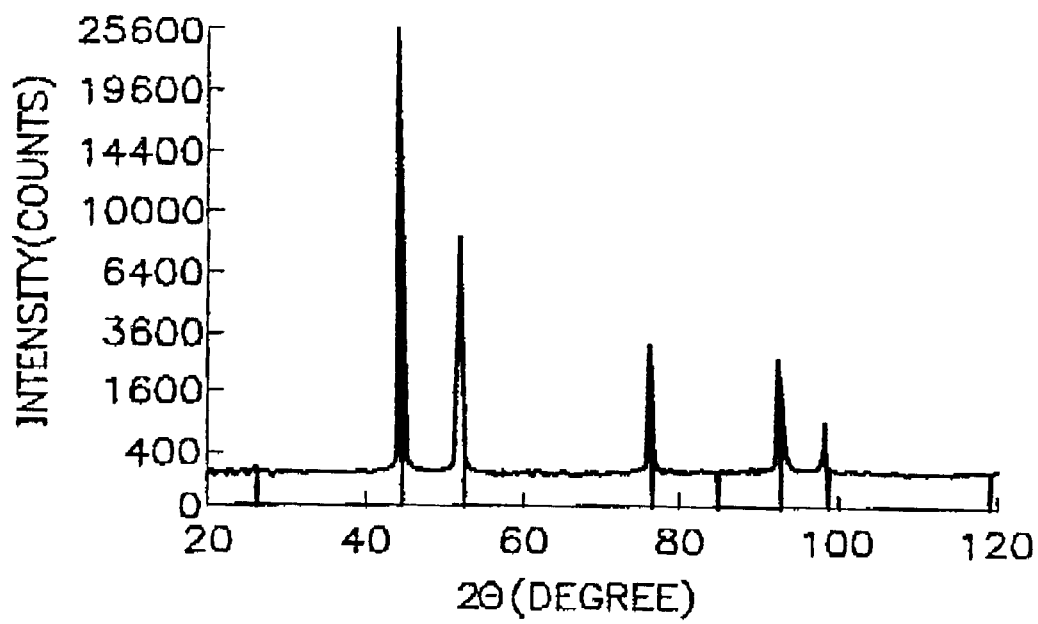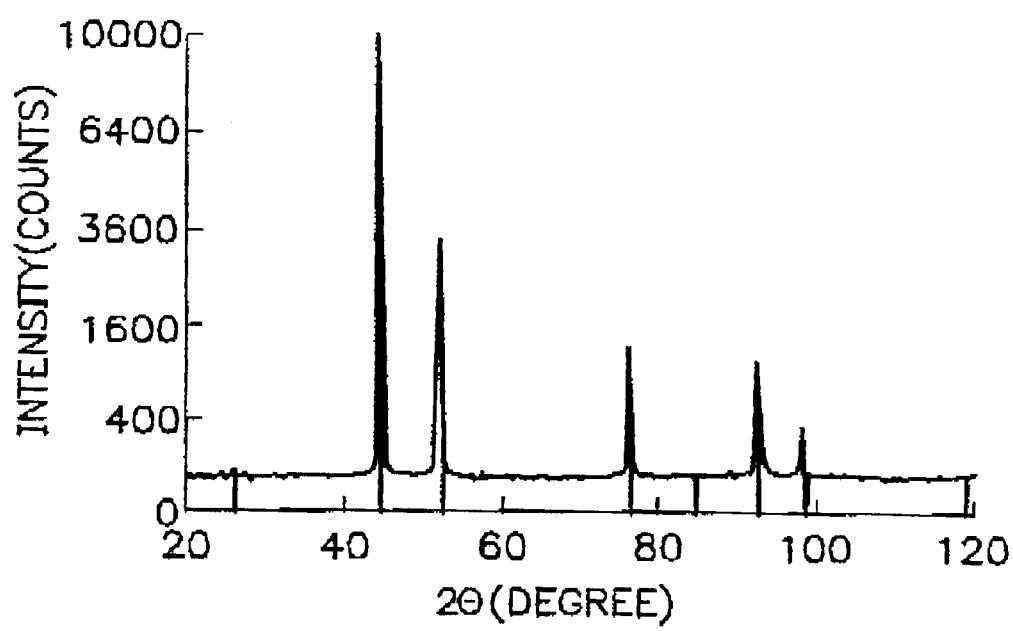
FIG. 8

METHOD AND TRANSFERRED ARC PLASMA SYSTEM FOR PRODUCTION OF FINE AND ULTRAFINE POWDERS

FIELD OF THE INVENTION

The present invention relates to a method for the production of fine and ultrafine powders of various materials such as metals, alloys, ceramics, composites and the like with controlled physical properties. To carry out the method, a novel and flexible transferred arc plasma system providing the ability to control powder properties with a high production rate has been developed. The transferred arc plasma system comprises a transferred arc plasma reactor and a separate quench system within which powder condensation occurs.

BACKGROUND OF THE INVENTION

Fine powders of metals, alloys, ceramics, composites and the like have a wide variety of applications in various fields such as aeronautics, electronics, microelectronics, ceramics and medicine. Currently, generation of fine powder, i.e., powders having an average particle size between 0.1 and 10 $\mu$m, is mainly accomplished via 3 different techniques: 1) hydrometallurgy, 2) spray pyrolysis and 3) milling. Among the disadvantages of the above techniques are high operating costs, production of non-spherical particles and generation of toxic or difficult to handle by-products.

The benefits obtained with ultrafine powders, i.e., powders with an average particle size lower than 100 nm, are mainly due to their small particle size, which results in a higher surface area/volume ratio. Consequently, ultrafine powders may have advantages over fine powders when used in the above fields.

The preferred methods for the production of fine powders are hydrometallurgy and spray pyrolysis. However, these methods have several major drawbacks including preparation and handling of the feed materials like chlorides and nitrates, which are very often toxic and difficult to handle, environmental emission control requirements for gaseous and liquid effluents, and a difficulty to produce average particle sizes below 100 nm.

Thermal plasma based vapor condensation methods have demonstrated their ability to generate average particle sizes below 100 nm without the handling and environmental problems associated with hydrometallurgical and spray pyrolysis methods. These problems are avoided because the feed materials are generally inert. Examples of such materials include pure metals, alloys, oxides, carbonates etc. Such plasma methods are able to vaporize or decompose these feed materials because of the high-energy input that can be achieved.

Thermal plasma generation is typically accomplished via 2 methods, i.e., high intensity DC arcs which uses currents higher than 50 A and pressures higher than 10 kPa, or high frequency discharges such as an RF plasma. Because of their high-energy efficiency, DC arcs are generally preferred. DC arcs are classified as transferred when one of the electrodes is a material being processed, and non-transferred when the electrodes are non-consumable. Since transferred arc systems pass electrical current directly through a material being processed, their energy efficiency is higher than non-transferred transferred arc systems. Because of the extremely high heat input into the material acting as the electrode, vaporization or decomposition occurs, thus producing a vapor phase that is then cooled to induce the formation of the powder. The powder product is then typically recovered in a filtration unit.

Thermal plasma based vapor condensation methods which utilize a transferred arc have not been successful up to now to generate fine or ultrafine powders of materials like metals, alloys, ceramics or composites on a commercial scale because of their low energy efficiency, low production rate, poor yield, and rudimentary control of powder properties such as particle size and distribution, shape, and crystallinity. In addition, this method is typically used for the production of powders with an average particle size lower than 0.1 $\mu$m, which has also contributed to its lack of success on an industrial scale because today's market requires powders with larger particle sizes.

In addition to producing fine and ultrafine powders of various pure materials, transferred arc plasma systems can also be used for the production of fine and ultrafine powders resulting from the interaction of two or more components (chemical reaction) or elements (alloying).

Although transferred arc plasma systems can operate batchwise, it is preferred that they be operated in a continuous manner. The material to be vaporized or decomposed can be fed continuously in the reactor in several manners. For example, it can be fed into a crucible either from the top thereof by a side tube in the reactor wall. The material can also be pushed upward underneath the plasma in a continuous manner, or fed directly into the plasma torch. Depending on the powder to be produced, the operator will select the appropriate method. Generally, the preferred feeding method is through one or more tubes located in the upper portion of the reactor. The feed materials can be in solid (wire, rod, bar, chunks, shots etc.) or liquid form. When in liquid form, the feed material can also be pumped into the reactor.

U.S. Pat. No. 4,376,740 discloses a method for producing fine metal powders which involves reacting a molten metal or alloy with hydrogen using an arc or plasma discharge, or an infrared radiation which dissolves the hydrogen in the metal. When the dissolved hydrogen is released from the molten metal, fine metal powders are generated. Using this method, a low production rate and yield is attained because of the use of a cold-walled reactor and a water-cooled copper mold which is used to support the material being processed. The maximum production rate reported is less than 240 g/hr. Further, there is no mention or suggestion of control of powder properties.

A critical aspect of transferred arc plasma systems is that they consume a lot of energy. It is therefore imperative to maximize its efficiency to have a viable commercial method. This means that the temperature within the reactor must be maintained as high as possible to prevent condensation of the vaporized or decomposed materials therein, either on the plasma chamber walls, outside surface of the plasma torch or the mold, which is very often a crucible. Such maximization would obviously result in higher production yields of powders. Because of the extreme conditions prevailing in the transferred arc reactor, many elements are generally water-cooled to extend their operating life. Obviously, such cooling has the effect of reducing the energy efficiency of the method. It has been proposed in Ageorges et al. in *Plasma Chem. and Plasma Processing*, 1993, 13 (4) 613–632 to modify the interior of a transferred arc reactor by covering its internal surfaces with a graphite lining to retain as much heat as possible inside the reactor.

Ageorges et al. supra, also disclose the production of ultrafine aluminium nitride (AlN) powder using a transferred arc thermal plasma based vapor condensation method. Vaporizing aluminium and reacting it with nitrogen and ammonia in an insulated plasma chamber produces the desired aluminium nitride product. Aluminium is vaporized by using it as the anode material in a transferred arc configuration that employs a thoriated tungsten tip cathode. The aluminium being vaporized is in the form of an ingot placed in a graphite crucible surrounded by a water-cooled stainless steel support. Because of the presence of that water-cooled jacket, the energy efficiency of vaporization is reduced. A disadvantage of this process is due to the fact that the formation of powder occurs in the plasma chamber because of the injection of reactive gases in the plasma chamber, i.e., nitrogen and ammonia. Ageorges et al. specifically state that the plasma chamber is "filled with fume products which recirculate in the furnace". As a result, powder property control is very crude because of the difficulty in properly controlling nucleation and growth of the powder product in the plasma chamber. The particles produced are reported to have a nominal particle size of 135 nm based on specific surface area measurements.

To better control the formation of ultrafine aluminium nitride powder, Moura et al. in *J. Am. Ceramic Soc.*, 1997, 80 (9), 2425–2428 propose the separation of aluminium vaporization and aluminium nitride formation. This is accomplished by vaporizing an aluminium anode in a transferred arc reactor in which no reactive gas is introduced, and reacting the aluminium vapor with ammonia injected at a single point in a separate reactor tube attached to the exit of the plasma chamber. The aluminium nitride powders generated with this method have a mean particle size of approximately 20 nm.

Da Cruz et al. in *IEEE Trans. on Plasma Science*, 1997, 25 (5), 1008–1016 reports using a thermal plasma based vapor condensation method using a DC transferred arc plasma system. In this work, an aluminium anode is vaporized by striking a thermal Ar or $Ar/H_2$ arc to it. The aluminium vapor is reacted and cooled rapidly in a separate quench tube to generate ultrafine aluminium nitride powders. The reactor exit gas containing the aluminium vapor is quenched at a single point using an $Ar/NH_3$ mixture resulting in the production of ultrafine powders. This technique is similar to that described by Moura et al. supra. The powders produced have very high specific surface area (40–280 $m^2/g$) and an average particle size of less than 50 nm.

Chang et al. in *Third Euro-Ceramics*, 1993, 1, 15–20 use a transferred arc thermal plasma based vapor condensation method to produce ultrafine ceramic and composite powders. In their production of $SnO_2$ or $Ag/SnO_2$ powders, a tin or silver/tin anode is vaporized by striking an arc to it while it is contained in a graphite crucible surrounded by a water-cooled stainless steel support similar to that described by Ageorges et al. supra. A reactive gas, i.e., oxygen, is added to the plasma chamber, resulting in the formation of the product that is then transported to a quenching section. Because oxygen is added into the plasma chamber, both vaporization and reactive steps are conducted in one vessel. In the works of Da Cruz et al. and Moura et al. supra, the vaporization and reactive steps in the production of the powder compound are separated to better control the particle formation process.

Chang et al. in $12^{th}$ *International Symposium on Plasma Chemistry*, 1995, 1207–1212 use a similar method to that of Chang et al. in Third Euro-Ceramics supra. In this work, silica powders are produced. The silica raw material is vaporized by injecting it in a particulate form, i.e., sand with a particle size of 100–315 $\mu$m, into the arc. The arc is struck between a non-consumable cathode and an anode that is not made of the material being vaporized. As a result, the energy efficiency of this method is likely to be lower than those previously mentioned which use true transferred arc operation. Most of the particles that made up the silica powder product had a particle size ranging from 50 to 400 nm.

It has been shown theoretically that by controlling the initial vapor concentration and temperature, residence time of particle nucleation and growth, and cooling profile, one may have some control on the particle size and distribution and crystallinity. This is shown by Okuyama et al. in AIChE Journal, 1986, 32 (12), 2010–2019 and Girshick et al. in *Plasma Chem. and Plasma Processing*, 1989, 9 (3), 355–369. When this method is used for fine powder production as demonstrated by Ageorges et al. and Chang et al. supra, control of the powder properties is very crude because no apparatus or procedure is described to accurately control the nucleation, growth and crystallization of particles in the quench section. In addition, in both the works of Ageorges et al. and Chang et al. supra, no attempt is made to limit the nucleation and growth of particles in the plasma chamber, which also contributes to the lack of proper control of powder properties. Control of the particle size and distribution, and crystallinity of fine and ultrafine powders produced using a transferred arc thermal plasma based vapor condensation method is therefore very limited.

In certain fields, such as electronics or metallurgy, mean size and distribution, and crystallinity of the powder represent critical properties. Accordingly, if such properties can be controlled during the manufacturing process of the powders, it would give to its producer a significant advantage over current fine and ultrafine powder manufacturers.

SUMMARY OF THE INVENTION

In accordance with the present invention, there is now provided a transferred arc thermal plasma based vapor condensation method for the production of fine and ultrafine powders of materials such as metals, alloys, ceramics, composites, and the like. More specifically, the method comprises the steps of:

providing a material to be vaporized or decomposed in a plasma reactor;

striking an arc between the material and an electrode to generate a plasma having a temperature sufficiently high to vaporize or decompose the material and form a vapor thereof;

optionally injecting a diluting gas in the plasma reactor;

transporting the vapor by means of the plasma gas and optional diluting gas into a quench tube wherein the vapor is condensed and powder formation occurs, the quench tube comprising a first section for indirectly cooling or heating the vapor and any particle present therein, to substantially control particle growth and crystallization; and a second section coupled to the first section for directly cooling the vapor and any particle present therein; and collecting and optionally filtering the powder particles in a collection unit.

In a preferred embodiment, the diluting gas is heated to a temperature corresponding to that of the vapor, or at least 1000 K, before being injected continuously or semi-continuously in the plasma chamber. The injection flow rate of the diluting gas can be varied depending on several parameters such as production rate, powder properties, plasma gas flow rate, vapor concentration etc. Any operator skilled in the art can determine the optimum diluting gas injection flow rate.

In a further preferred embodiment of the present method, a straight polarity configuration is used, i.e., the liquid material in the crucible is the anode and the electrode is the cathode. In addition, the electrode is non-consumable and is located inside the plasma torch.

In a second aspect of the present invention, there is provided a quench tube suitable for the condensation of vapor such as that produced from a transferred arc reactor. More specifically, the quench tube comprises a first section with an elongated substantially tubular body having cooling or heating means around the body for indirectly cooling or heating the vaporized material passing therethrough, thus controlling the growth and crystallization of the particles; and a second section coupled to the first section comprising means for directly cooling the vapor and particles thereof In a preferred embodiment, the second section comprises an extension of the tubular body of the first section, and the direct cooling is done by injecting a cooling fluid directly onto the vapor.

The inner tube diameter and the length of the first section of the quench tube can be varied depending on various parameters, such as powders to be produced, properties desired for these powders, flow rate of the carrier gas, particle size desired, etc. Any experienced engineer or operator skilled in the art may adjust these parameters according to powder properties desired.

IN THE DRAWINGS

FIG. 6 illustrates the size distribution of copper particles produced in accordance with the method of the present invention.

FIG. 7 illustrates the controlled mean diameter of copper particles produced in accordance with the method of the present invention.

FIG. 8 illustrates the crystallinity obtained for copper and nickel powders produced in accordance with the present method.

DETAILED DESCRIPTION OF THE INVENTION

Figure 1:
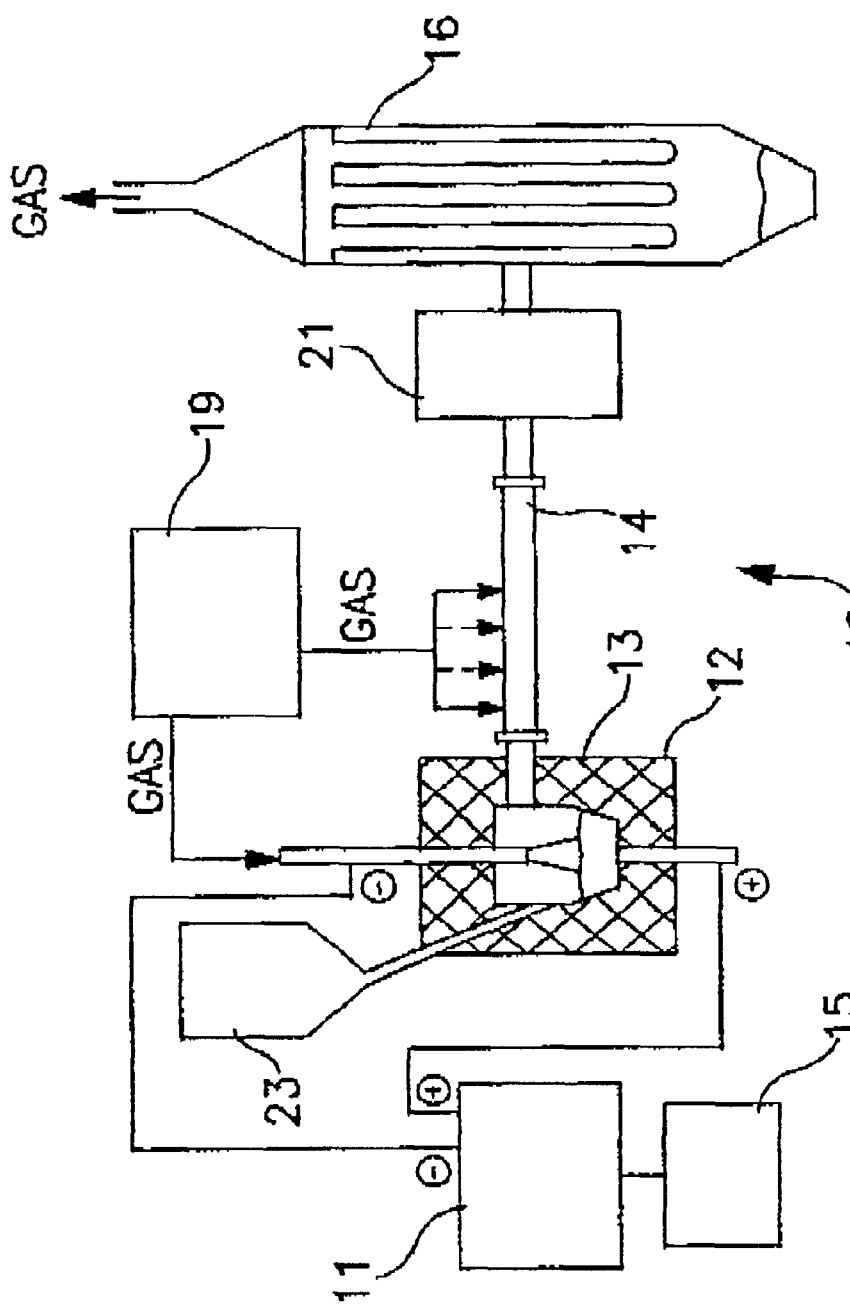
FIG. 1 illustrates the components of a typical transferred arc plasma system.

In accordance with the present invention, there is now provided a method for the continuous or batch production of fine and ultrafine powders of materials like metals, alloys, ceramics, composites, and the like, that allows the substantial control of properties of the powders produced. The properties that can be substantially controlled are the mean particle size, the size distribution and the crystallinity.

For the purposes of the present invention, the expression "indirect cooling or heating" can be defined as cooling or heating means wherein the coolant or heating does not come in direct contact with the vapor and condensed particles therein, if any, in the vapor exiting the plasma chamber. On the other hand, "direct cooling" is defined as cooling means wherein the coolant is directly contacted with the material's vapor.

The present method comprises striking an arc between an electrode, preferably a non-consumable electrode inside the torch, and a material acting as the other electrode that can be vaporized or decomposed in a straight or reverse polarity configuration. In a straight polarity configuration, the material vaporized or decomposed acts as the anode and the non-consumable electrode acts as the cathode. The material vaporized or decomposed is therefore in a liquid state. As stated above, suitable materials for the method include any electrically conductive material, such as pure metals, alloys, ceramics, composites etc. Examples of metal powders that can be produced include, without being restricted thereto, powders of silver, gold, cadmium, cobalt, copper, iron, nickel, palladium, platinum, rhodium ruthenium, tantalum, titanium, tungsten, zirconium, molybdenum, niobium and the like, as well as alloys thereof Examples of ceramic powders include, without being restricted thereto, powders of $Al_2O_3$, $TiO_2$, SiC, TaC, $Si_3N_4$, BN etc. Examples of composite or coated powders include, without being restricted thereto, powders of SiC/Si, $Si_3N_4$/Si, NiO/Ni, CuO/Cu etc.

In a continuous method, the material to be vaporized or decomposed can be added continuously or semi-continuously into a crucible that may or may not be electrically conductive at the operating temperature. Typically, the crucible used to contain the material being vaporized or decomposed is electrically conductive so that an auxiliary electrode connection is not required. If an electrically conductive crucible which does not dissolve or react with the material at the operating temperature is not available, a non-electrically conductive crucible which does not have these limitations can be used along with an auxiliary electrode connection. As for the feed material, it can be in any form including solid particles, wire, rod, liquids etc.

Typical plasma torch feed gas flow rates vary depending on the power level and the torch design. Further, when production rates are increased, dilution of the vapor formed from the vaporization or decomposition of the materials in the plasma chamber may be required. Dilution reduces the concentration of the vapor and prevents significant condensation of the vapor, which would lead to the formation of particles in the plasma chamber and hinder the control of powder properties in a separate quench section, as well as reducing the yield. The diluting gas can be added directly to the plasma gas, but this method is usually limited to the maximum operating flow rate of the plasma torch. This is why it is necessary to have additional means for injecting diluting gases in the plasma chamber. Also, such diluting gas must be injected in the plasma chamber at a sufficiently high temperature to minimize local quenching which would also lead to particle generation in the plasma chamber. To that effect, at least one gas port is installed to allow additional hot gas to be injected into the plasma chamber. All the gases added into the plasma chamber are selected to minimize reaction with the vapor.

Appropriate flow rates for both the torch and the dilution gases can be easily determined by anyone of ordinary skill in the art. These flow rates are dependent on several factors such as production rate, power level, desired particle size etc. As an example, for producing copper or nickel powders of about 0.5 $\mu$m at a production rate of 2 kg/h and a power level of from about 50 to about 100 kW, a diluting gas flow rate and a torch gas flow rate of about 1000 $\lambda$/min and 60 $\lambda$/min respectively are required. The plasma chamber pressure is preferably maintained between 0.2–2.0 atm, and more preferably around 1 atm.

It is important that the reactor be well insulated to maximize energy efficiency and yield, and also to minimize the condensation of the material vaporized or decomposed within the chamber, thus preventing particle formation therein. The vapor is transported from the plasma chamber to a quench tube where the powder particles are grown, and ultimately condensed. The fine or ultrafine powder product can then be collected through any conventional collection/filtration equipment.

The method of the present invention provides an energy efficient method for producing fine and ultrafine powders at a production rate of about at least 0.5 kg/h while avoiding the handling and environmental problems associated with conventional hydrometallurgical and spray pyrolysis methods. Current transferred arc systems can only produce at a rate not exceeding 0.2 kg/h, and lack extensive control of powder properties. The present method permits the relatively simple and cost effective production of fine and ultrafine powders of materials like pure metals, alloys, ceramics, composites etc. with the ability to substantially control the properties of the powders.

The invention will now be described by referring to the drawings, which are provided to illustrate the preferred embodiments of the invention. These drawings shall in no way be considered as limiting the scope of the invention.

Referring to FIG. 1, there is provided a plasma system 10, comprising a transferred arc plasma reactor 12 insulated with an insulating material 13 such as alumina felt, a quench tube 14, and a powder collection unit 16. Reactor 12 is coupled to a power supply 11, which is itself coupled to a control panel 15. A supply control unit 19 is also provided for controlling the supply of gases and water in reactor 12. A heat exchanger 21 may optionally be inserted between unit 16 and quench tube 14 to further lower the temperature of the powder before collecting it. When the system is used in a continuous mode, which is almost always the case, a feeder 23 is provided to feed the material inside plasma chamber 17.

Figure 2:
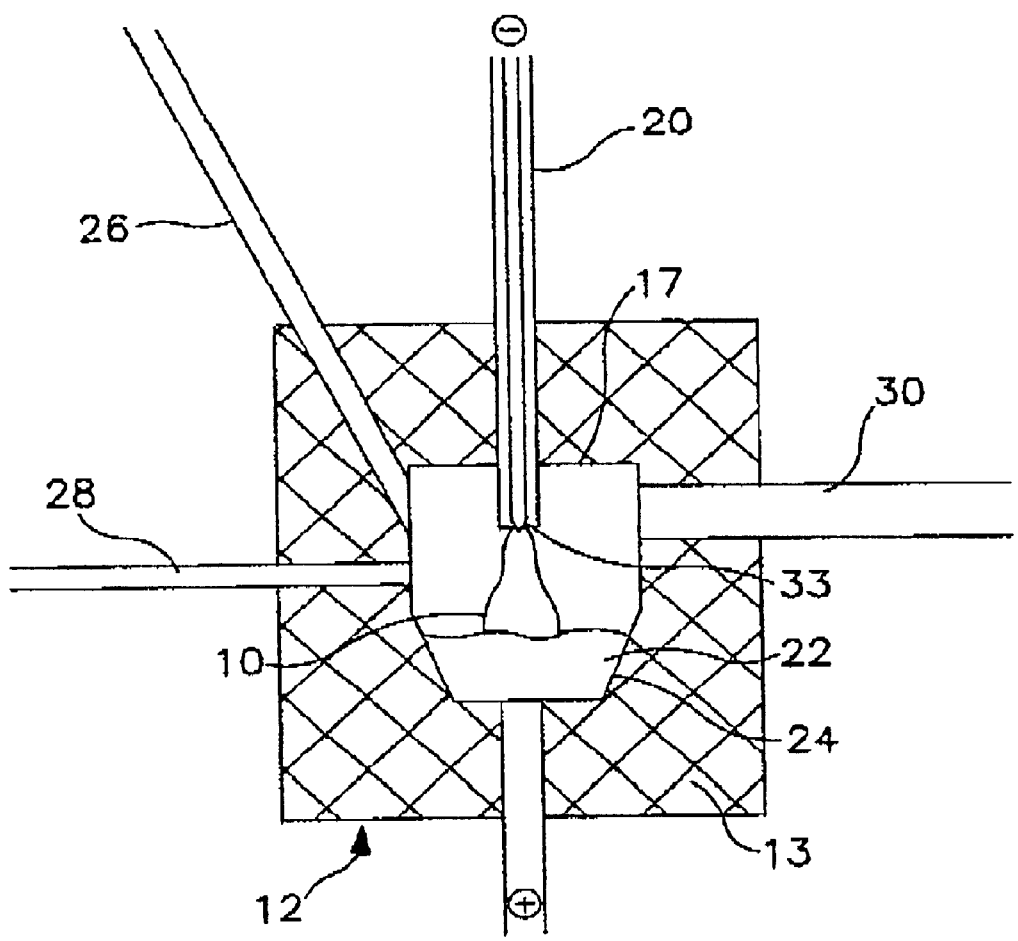
FIG. 2 illustrates a transferred arc plasma chamber suitable for the purposes of the present method.

FIG. 2 illustrates the interior of plasma reactor 12, which comprises a plasma chamber 17. An arc 18 is struck between an electrode 33, preferably non-consumable, located inside torch 20 and material 22 contained in a ceramic crucible 24. As material 22 is vaporized or decomposed, further material is added continuously or semi-continuously in the crucible, for example through at least one pipe 26. A heated diluting gas, preferably argon, helium, hydrogen, nitrogen, ammonia, methane or mixtures thereof, is injected through a pipe 28 into chamber 17 to transport the vapor from chamber 17 into quench tube 14 via at least one exit port 30, powder condensation occurring inside quench tube 14. The powder product exiting the quench tube 14 can be recovered in any suitable solid/gas or solid/liquid separator, such as a particle filtration unit, a scrubber or the like.

When the system is in operation, the energy required for vaporizing or decomposing material 22 is supplied by arc 18 maintained between material 22, which is partly or completely liquefied in crucible 24, and electrode 33. At least one diluting gas is continuously or semi-continuously injected into plasma chamber 17 in addition to the feed gas of plasma torch 20, this at least one diluting gas being heated to a temperature preferably corresponding to the temperature of the vapor exiting the plasma chamber, or at least higher than 1000 K, to minimize localized condensation of the vapor.

Typically, transferred arc plasma systems, a straight polarity configuration is used in which electrode 33 acts as the cathode and liquid material 22 acts as the anode. However, a reversed polarity configuration is highly advantageous when high operating currents are used because the erosion of electrode 33 is drastically reduced when it acts as the anode.

Preferred arc lengths are from about 2 to 20 cm, but the operator, depending on the material to be produced, can vary the length at will. Pressure inside chamber 17 is preferably maintained between 0.2–2.0 atm, the most preferred operating pressure being 0.8–1.2 atm.

Figure 3C:
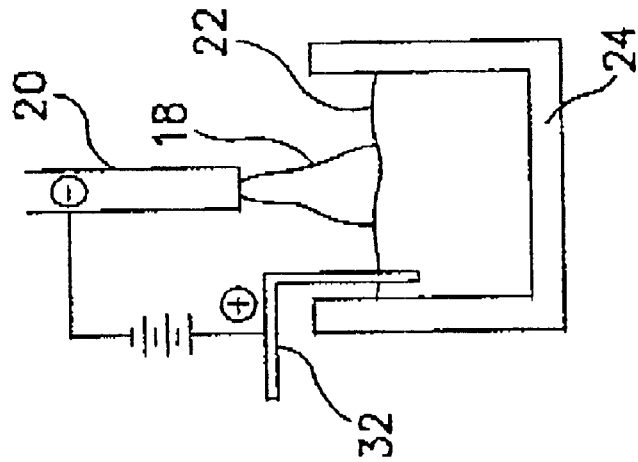
FIG. 3 illustrates preferred embodiments of transferred arc configurations suitable for the purposes of the present method.
Figure 3B:
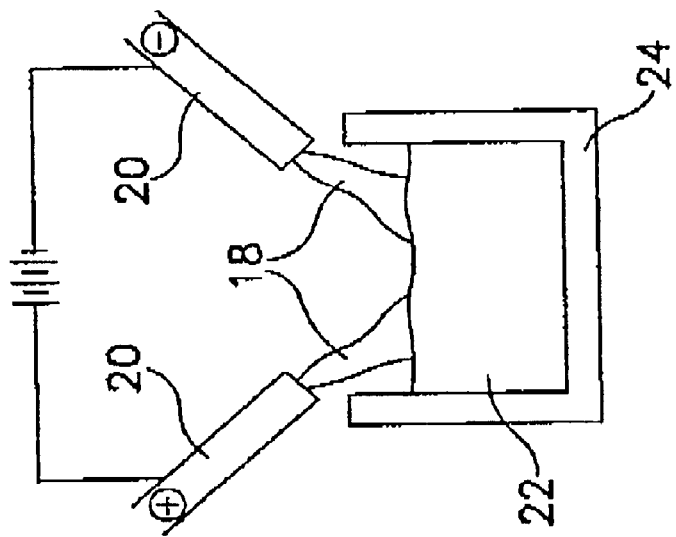
Figure 3A:
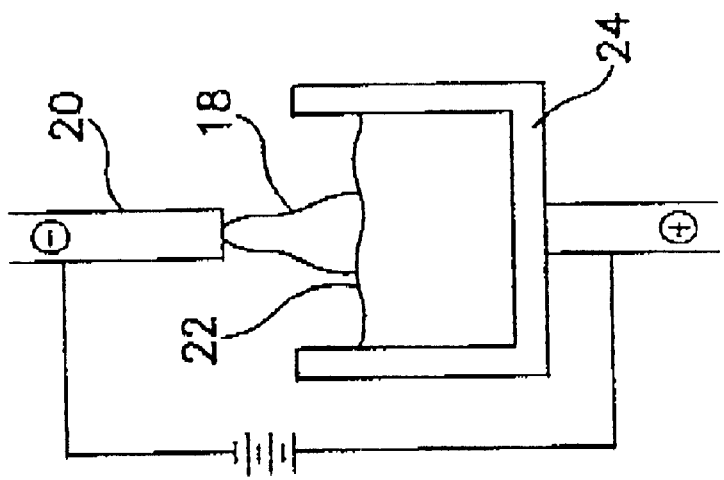

FIG. 3 illustrates various alternative transferred arc arrangements inside the plasma chamber. FIG. 3A illustrates a preferred crucible arrangement when the latter is conductive. FIGS. 3B and 3C illustrate configurations wherein an auxiliary electrode 32 is used. Such configuration is suitable when the electrical conductivity of crucible 24 is not efficient, or when the crucible is not conductive at all. It should be noted that an auxiliary electrode may be used even when the crucible is electrically conductive at the operating temperature. The auxiliary electrode connection 32 may or may not be in direct contact with material 22. The direct contact to material 22 can be either from the top (FIG. 3C), bottom or side. When not in direct contact, auxiliary electrode 32 can be a plasma torch, as per FIG. 3B, a water-cooled probe or the feed material.

Preferred materials of construction for crucible 24 include high melting point materials such as graphite, carbides such as tantalum carbide, silicon carbide, titanium carbide etc.; oxides such as magnesia, alumina, zirconia etc.; nitrides such as titanium nitride, tantalum nitride, zirconium nitride, boron nitride etc.; borides such as titanium diboride, tantalum diboride, zirconium diboride etc.; as well as refractory metals such as tungsten, tantalum, molybdenum, niobium etc.

Figure 4:
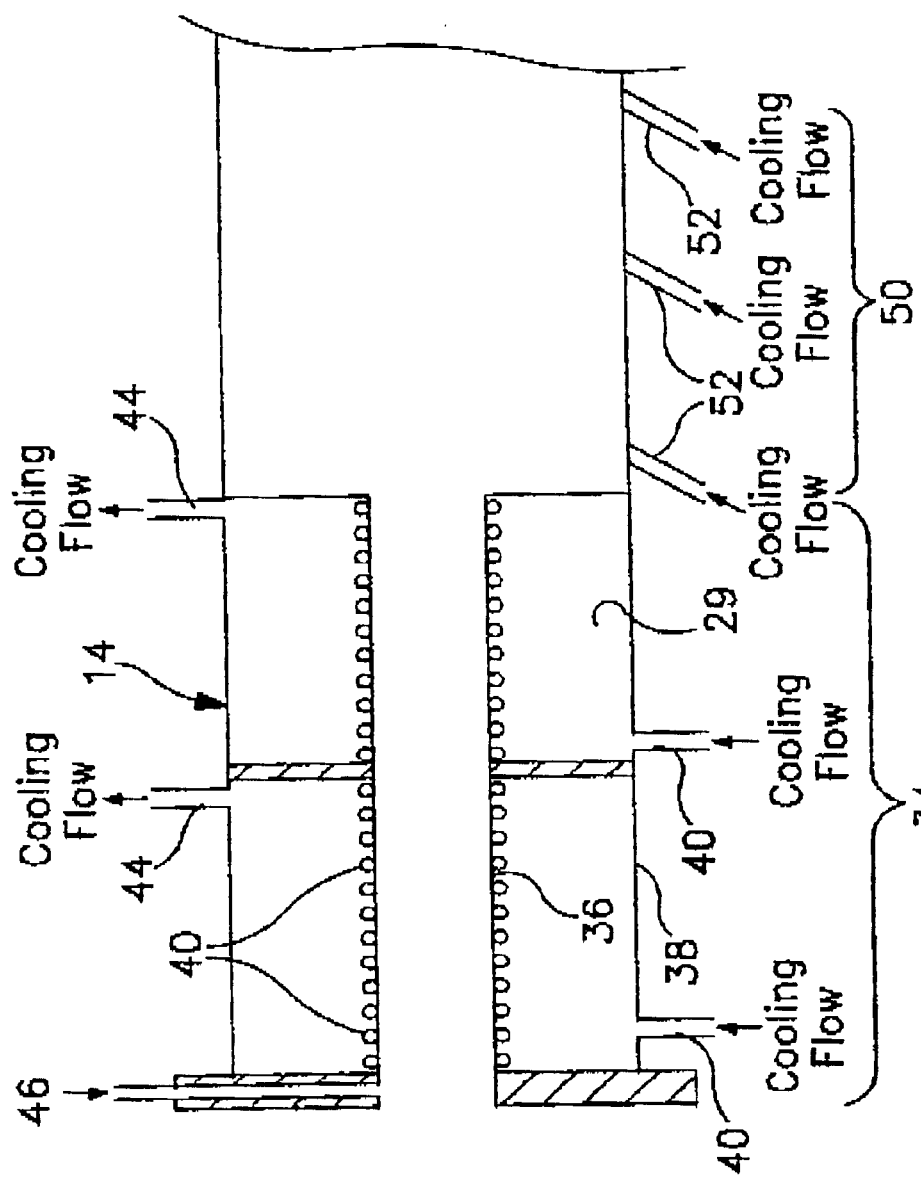
FIG. 4 illustrates a preferred embodiment of a quench tube according to the present invention.

FIG. 4 illustrates a preferred embodiment of a quench tube according to the present invention. The vaporized or decomposed material exits chamber 17 in the form of vapor combined with the diluting gas and the plasma gas, and enters into the first section 34 of quench tube 14. First section 34 allows an indirect controlled cooling or heating of the vapor to nucleate the desired product and control the particle growth and crystallization. The indirect heating or cooling can be done using a heating or cooling fluid that is circulated in channel 29 which is formed by the inner surface of an external coaxial tube 36 and the external surface of tube 38. Tube 36 can also be replaced or combined with one or more heating or cooling elements 40 also surrounding tube 38 throughout part or all of its length. The length of section 34 can be varied depending on the size of particles required, the flow rate of the diluting gas, the properties desired for the powders etc. Tube 36 includes at least one inlet 42 and an at least one outlet 44 to allow fluid circulation therein.

In the event that a reagent needs to be added to the vapor to produce powders of a product resulting from the reaction between this reagent and the vapor, the reagent may be introduced in the form of a hot reactive gas at one or more points in the first section 34, for example through an inlet 46. Examples of possible reactive gases include nitrogen, hydrogen, ammonia, methane, oxygen, water, air, carbon monoxide or mixtures thereof. The hot reactive gas is also injected at a temperature preferably close to the temperature of the vapor exiting the plasma reactor, or at least higher than 1000 K, to minimize direct cooling of the vapor. Most preferably, the temperature of the injected hot reactive gas is higher than or at least equal to the temperature of the vapor exiting chamber 17. The inner tube of the quench tube should be constructed from a material that can support the temperature of the vapor exiting the plasma chamber. A preferred material is graphite.

To the first section 34 is coupled a second section 50, provided for the direct cooling of the vapor and any powder particles that may have been formed during the passage in first section 34. Direct cooling is performed by injecting a fluid, whether liquid or gaseous, directly onto the vapor and/or powder particles through at least one inlet 52. Preferred gases for direct cooling of the vapor and the powder particles, if any are present, include argon, nitrogen, helium, ammonia, methane, oxygen, air, carbon monoxide, carbon dioxide or mixtures thereof Preferred liquids include water, methanol, ethanol or mixtures thereof, which are typically injected as a spray.

Figure 5:
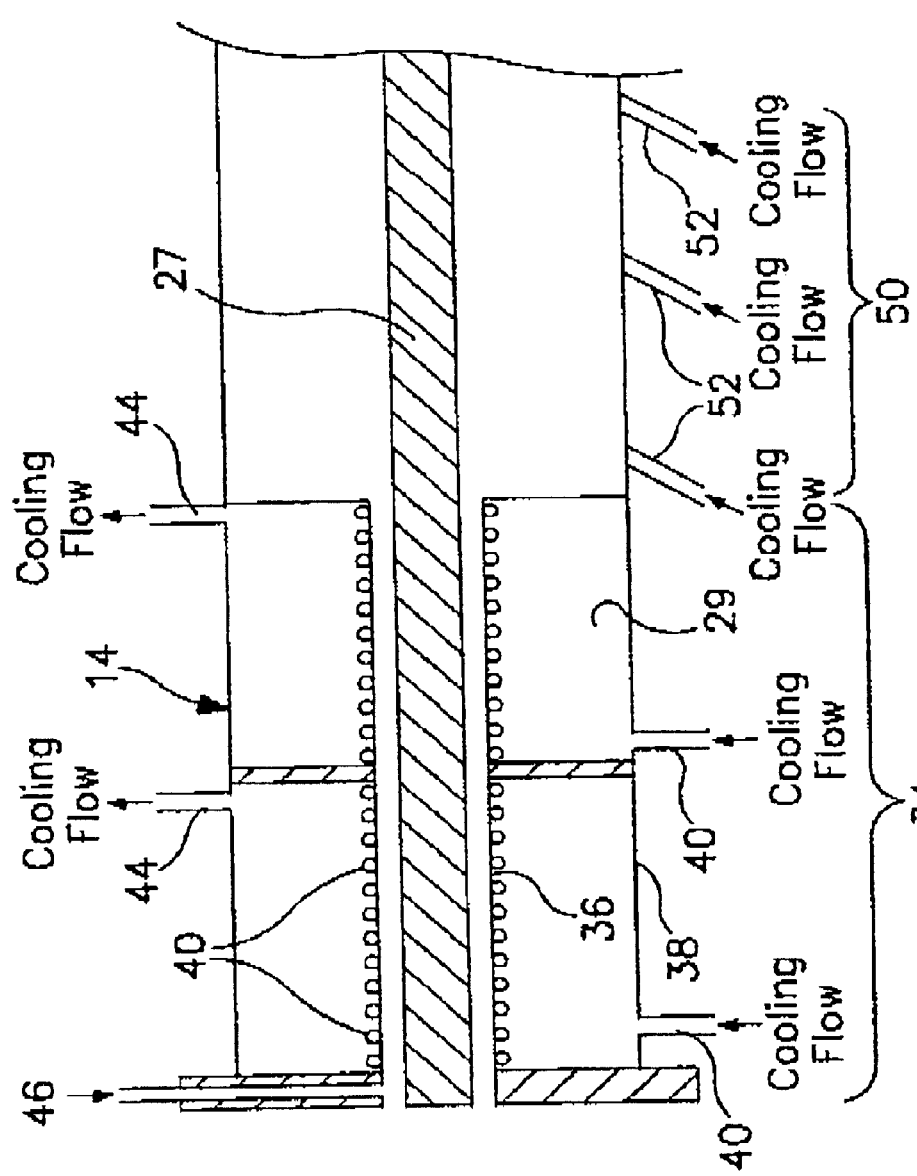
FIG. 5 illustrates another embodiment of the quench tube according to the present invention.

The cross-section of the inner tube 38 can be any shape. As an alternative, tube 38 is an annular design with the vapor flowing through the annular gap. This embodiment is illustrated in FIG. 5 wherein an elongated body 27 is provided inside tube 38 to form a channel between the inner surface of body 38 and the external surface of body 27.

The following examples are provided to illustrate the present invention, and should not be construed as limiting its scope. Fine metal powder production was carried out using a transferred arc thermal plasma system as illustrated in FIG. 1 comprising a reactor as illustrated in FIG. 2, and a quench tube as illustrated in FIG. 4. For this purpose, any conventional plasma torch can be used. The crucible can be graphite or any suitable ceramic. The material to be vaporized was fed into the crucible in the form of pellets or shots through a port in the upper section of the plasma chamber.

EXAMPLE 1

Fine copper powders with controlled mean particle size and distribution were produced. In Tests 1 and 2, the control of mean particle size is demonstrated using different quench tube operating conditions. The transferred arc reactor conditions are substantially similar. A mean particle size of 0.78 $\mu$m was obtained in Test 1 and 1.74 $\mu$m in Test 2.

TABLE 1

13/32 Operating conditions and results for Test 1

| Operating Parameters | Conditions | Results |
|---|---|---|
| Reactor | Plasma gas flow rate = 40 $\lambda$/min Ar, 20 $\lambda$/min $H_2$<br>Power = 24.5 kw<br>Chamber pressure = 1.1 atm<br>Diluting gas = 85 $\lambda$/min Ar, T > 1000 K<br>Crucible material = graphite | Vaporization rate = 1.0 kg/h<br>Particle size distribution:<br>90% less than ($d_{90}$) = 1.77 $\mu$m<br>50% less than ($d_{50}$) = 0.78 $\mu$m<br>10% less than ($d_{10}$) = 0.21 $\mu$m<br>(see FIGS. 6a and 7a)<br>Span = ($d_{90}$ − $d_{10}$)/$d_{50}$ = 2.0<br>XRD count (2$\theta$ = 43.3°) = 31300 |
| Quench Tube | Length of first section = 10 cm<br>Diameter of the inner tube = 5 cm<br>Indirect cooling gas = 300 $\lambda$/min Ar<br>Second section direct cooling = 300 $\lambda$/min $N_2$ | |
| Collection | Porous metal filter | |

TABLE 2

Operating conditions and results for Test 2

| Operating Parameters | Conditions | Results |
|---|---|---|
| Reactor | Plasma gas = 40 $\lambda$/min Ar, 20 $\lambda$/min $H_2$<br>Power = 24.5 kw<br>Chamber pressure = 1.1 atm<br>Diluting gas = 85 $\lambda$/min $N_2$, T > 1000 K<br>Crucible material = graphite | Vaporization rate = 0.9 kg/h<br>Particle size distribution:<br>90% less than ($d_{90}$) = 3.67 $\mu$m<br>50% less than ($d_{50}$) = 1.74 $\mu$m<br>10% less than ($d_{10}$) = 0.74 $\mu$m<br>(see FIG. 6b)<br>Span = ($d_{90}$ − $d_{10}$)/$d_{50}$ = 1.7<br>XRD count (2$\theta$ = 43.3°) = 30700 |
| Quench Tube | Length of first section = 25 cm<br>Diameter of the inner tube = 5 cm<br>Indirect cooling gas = 200 $\lambda$/min Ar<br>Second section direct cooling = 300 $\lambda$/min Ar | |
| Collection | Porous metal filter | |

In Test 3 control of the size distribution is demonstrated. The size distribution was increased in Test 3 compared to Tests 1 and 2 (see FIG. 7).

TABLE 3

Operating conditions and results for Test 3

| Operating Parameters | Conditions | Results |
|---|---|---|
| Reactor | Plasma gas = 40 λ/min Ar, 20 λ/min $H_1$<br>Power = 24.5 kw<br>Chamber pressure = 1.1 atm<br>Diluting gas = 20 λ/min Ar, T > 1000 K<br>Crucible material = graphite | Vaporization rate = 0.9 kg/h<br>Particle size distribution:<br>90% less than ($d_{90}$) = 2.91 μm<br>50% less than ($d_{50}$) = 0.81 μm<br>10% less than ($d_{10}$) = 0.25 μm<br>(see FIG. 7b)<br>Span = ($d_{90} - d_{10}$)/$d_{50}$ = 3.3<br>XRD count (2θ = 43.3°) = 35800 |
| Quench Tube | Length of first section = 10 cm<br>Diameter of the inner tube = 5 cm<br>Indirect cooling gas = 100 λ/min Ar<br>Second section direct cooling = 300 λ/min $N_2$ | |
| Collection | Porous metal filter | |

EXAMPLE 2

Fine nickel powders with controlled crystallinity were produced. In Tests 4 and 5 the control of crystallinity is demonstrated using different quench tube operating conditions. The reactor conditions were substantially the same. The degree of crystallinity was measured by the maximum peak count in the X-ray diffraction profile for a given powder sample. This peak occurs at approximately 2θ=44.5° for nickel and 2θ=43.3° for copper. The maximum peak count for the nickel powder produced during Test 4 was 24800 compared to 9300 for the nickel powder produced during Test 5.

TABLE 4

Operating conditions and results for Test 4

| Operating Parameters | Conditions | Results |
|---|---|---|
| Reactor | Plasma gas = 40 λ/min Ar, 20 l/min $H_2$<br>Power = 28 kw<br>Chamber pressure = 1.1 atm<br>Diluting gas = 65 λ/min Ar, T > 1000 K<br>Crucible material = graphite | Vaporization rate = 0.5 kg/h<br>Particle size distribution:<br>90% less than ($d_{90}$) = 1.42 μm<br>50% less than ($d_{50}$) = 0.79 μm<br>10% less than ($d_{10}$) = 0.45 μm<br>Span = ($d_{90} - d_{10}$)/$d_{50}$ = 1.22<br>XRD count (2θ = 44.5°) = 24800<br>(see FIG. 8a) |
| Quench Tube | Length of first section = 15 cm<br>Diameter of the inner tube = 2.5 cm<br>Indirect cooling gas = 100 λ/min Ar<br>Second section direct cooling = 200 λ/min Ar | |
| Collection | Porous metal filter | |

TABLE 5

Operating conditions and results for Test 5

| Operating Parameters | Conditions | Results |
|---|---|---|
| Reactor | Plasma gas = 40 λ/min Ar, 20 l/min $H_2$<br>Plasma power = 28 kw<br>Chamber pressure = 1.1 atm<br>Diluting gas = 65 λ/min Ar, T > 1000 K<br>Crucible material = graphite | Vaporization rate = 0.5 kg/h<br>Particle size distribution:<br>90% less than ($d_{90}$) = 1.76 μm<br>50% less than ($d_{50}$) = 0.98 μm<br>10% less than ($d_{10}$) = 0.54 μm<br>Span = ($d_{90} - d_{10}$)/$d_{50}$ = 1.24<br>XRD count (2θ = 44.5°) = 9300<br>(see FIG. 8b) |
| Quench Tube | Length of first section = 15 cm<br>Diameter of the inner tube = 2.5 cm<br>Indirect cooling gas = 300 λ/min Ar<br>Second section direct cooling = 200 λ/min Ar | |
| Collection | Porous metal filter | |

While the invention has been described in connection with specific embodiments thereof, it will be understood that it is capable of further modifications and this application is intended to cover any variations, uses or adaptations of the invention following, in general, the principles of the invention and including such departures from the present disclosure as come within known or customary practice within the art to which the invention pertains, and as may be applied to the essential features hereinbefore set forth, and as follows in the scope of the appended claims.

What is claimed is:

1. A method for the production of fine and ultrafine powders with a transferred arc plasma system, the method comprising the steps of:
    providing a material to be vaporized or decomposed in a plasma reactor;
    supplying a plasma torch feed gas;
    striking an arc between the material and an electrode to generate a plasma having a temperature sufficiently high to vaporize or decompose the material and form a vapor thereof;
    injecting a diluting gas that is heated to a temperature of at least about 1000 K. into the plasma reactor, the diluting gas being injected at a port that is physically separated from the plasma torch feed gas;
    transporting the vapor, by means of the plasma gas and diluting gas, into a quench tube wherein the vapor is condensed and powder formation occurs, the quench tube comprising:
        a first section for indirectly cooling or heating the vapor, to cause particle growth and crystallization in the first section; and
        a second section coupled to the first section for directly cooling the particles present therein; and
        collecting the cooled particles in a collection unit.

2. A method for the production of fine and ultrafine powders with a transferred arc plasma system, the method comprising the steps of:
    providing a material to be vaporized or decomposed in a plasma reactor;
    supplying a plasma torch feed gas;
    striking an arc between the material and an electrode to generate a plasma having a temperature sufficiently high to vaporize or decompose the material and form a vapor thereof;
    injecting a diluting gas that is heated to a temperature of at least about 1000 K. into the plasma reactor;
    transporting the vapor by means of the plasma gas and diluting gas into a quench tube wherein the vapor is condensed and powder formation occurs, the transporting step further comprising the steps of:
        indirectly cooling or heating the vapor in a first section of the quench tube to cause particle growth and crystallization in said first section; and
        directly cooling in a second section of the quench tube the grown particles passing from the first section; and
    collecting the cooled particles in a collection unit,
    wherein the collecting step collects at least 0.5 kg/h of particles.

3. A method according to claim 1 or 2 wherein the quench tube is an elongated substantially tubular body.

4. A method according to claim 3 wherein the indirect cooling or heating is carried out by circulating a cooling or heating fluid in a channel around the body.

5. A method according to claim 1 or 2 wherein the material is selected from the group consisting of metals, alloys, ceramics and composites.

6. A method according to claim 1 or 2 wherein the material vaporized or decomposed is the anode and the electrode is the cathode and is non-consumable.

7. A method according to claim 1 or 2 wherein the material is provided in an electrically conductive crucible.

8. A method according to claim 1 or 2 wherein the material is fed in the plasma reactor in the form of solid particles, wire, rod, liquid, or mixtures thereof.

9. A method according to claim 8 wherein the crucible is made of graphite, a carbide, an oxide, a nitride, a boride, or a refractory metal.

10. A method according to claim 1 or 2 additionally comprising the injection of a reagent in the form of a hot gas into the first section through at least one inlet.

11. A method according to claim 1 or 2 wherein the direct cooling is carried out by injecting a cooling fluid directly onto the vapor.

12. A method according to claim 1 or 2 wherein the diluting gas is heated at a temperature of at least 1000 K.

13. A method for the production of a fine powder of a metal with a transferred arc plasma system, the method comprising the steps of:
    continuously providing a metal to be vaporized in a crucible inside a plasma reactor;
    supplying a plasma torch feed gas;
    striking an arc between the metal and a non-consumable electrode in a straight polarity configuration to generate a plasma having a temperature sufficiently high to vaporize the metal and form a vapor thereof;
    injecting a diluting gas that is heated to a temperature of at least 1000 K, into the plasma reactor, the diluting gas being port at a location that is physically separated from the plasma torch feed gas;
    transporting the vapor by means of the plasma gas and the diluting gas into a quench tube wherein the vapor is condensed and powder formation occurs, the quench tube comprising:
        a first section comprising an elongated tubular body for indirectly cooling or heating the vapor therein, the vapor passing through the inside of the body, and
        a second section coupled to the first section for directly cooling powder particles passing from the first section by injecting a cooling fluid directly into the second section; and
    collecting the powder particles in a collection unit.

14. A method for the production of a fine powder of a metal with a transferred arc plasma system, the method comprising the steps of:
    continuously providing a metal to be vaporized in a crucible inside a plasma reactor;
    supplying a plasma torch feed gas to the plasma reactor;
    striking an arc between the metal and a non-consumable electrode in a straight polarity configuration to generate a plasma having a temperature sufficiently high to vaporize the metal and form a vapor thereof;
    injecting a diluting gas that is heated to a temperature of at least 1000 K, into the plasma reactor the diluting gag being injected at a port that is physically separated from the plasma torch feed gas;
    transporting the vapor by means of the plasma gas and the diluting gas into a quench tube wherein the vapor is condensed and powder formation occurs;

the method further comprising the steps of (i) indirectly cooling or heating the vapor in a first section of the quench tube to cause particle growth and crystallization in the first section, and (ii) directly cooling the grown particles in a second section of the quench tube by injecting a cooling fluid directly into the second section; and collecting the cooled particles in a collection unit.

15. A method according to claim 13 or 14 wherein the metal is selected from the group consisting of silver, gold, cadmium, cobalt, copper, iron, molybdenum, nickel, niobium, palladium, platinum, rhodium, ruthenium, tantalum, titanium, tungsten, zirconium and alloys thereof.

16. A method according to any one of claims 1, 2, 13, or 14, wherein the diluting gas is injected to cause reduction of vapor concentration in the plasma reactor.

17. A method according to any one of claims 1, 2, 13, or 14, wherein the diluting gas is injected to cause prevention of vapor condensation in the plasma reactor.

18. A method according to any one of claims 1, 2, 13, or 14, wherein the diluting gas is injected to cause prevention of particle formation in the plasma reactor.

19. A method according to any one of claims 1, 2, 13, or 14, wherein the collecting step collects at least 0.5 kg/hr of particles.

20. A method according to any one of claims 1, 2, 13, or 14, wherein the transporting step causes nucleation to take place in the first section of the quench tube.

21. A method according to any one of claims 1, 2, 13, or 14, further comprising the step of adding a reagent in the first section.

22. A method according to any one of claims 1, 2, 13, or 14, further comprising the step of providing a plurality of different cooling zones in the first section of the quench tube.

23. A method according to any one of claims 1, 2, 13, or 14, further comprising the step of providing both heating structure and cooling structure in the first section.

24. A method according to any one of claims 1, 2, 13, or 14, further comprising the step of providing a non-conductive crucible in the plasma reactor.

25. A method according to any one of claims 1, 2, 13, or 14, further comprising the step of providing a cooling gas flow of at least 100 l/min to the second section of the quench tube.

26. A method according to any one of claims 1, 2, 13, or 14, further comprising the step of providing at least one of heating structure and cooling structure in the first section.

27. A method according to any one of claims 1, 2, 13, or 14, further comprising the step of providing heat management structures to cause varying thermal conditions downstream of the plasma reactor.

28. A method according to claim 27, wherein the step of providing heat management structures includes the step of providing heat management structures to cause varying thermal conditions in the quench tube.

29. A method according to claim 28, wherein the step of providing heat management structures includes the step of providing heat management structures to cause varying thermal conditions in the first section of the quench tube.

30. A method according to any one of claims 1, 2, 13, or 14, further comprising the step of providing heat management structures in the first section of the quench tube to reduce the material temperature to below its solidification temperature to cause particle growth and crystallization.

* * * * *